United States Patent [19]

Dieter et al.

[11] Patent Number: 5,190,001
[45] Date of Patent: Mar. 2, 1993

[54] FUEL SUPPLY SYSTEM FOR AN ENGINE OPERATING AN ALCOHOL-CONTAINING FUEL

[75] Inventors: Steinke Dieter, Wolfsburg; Uwe Kammann, Warberg, both of Fed. Rep. of Germany

[73] Assignee: Volkswagen AG, Wolfsburg, Fed. Rep. of Germany

[21] Appl. No.: 747,681

[22] Filed: Aug. 20, 1991

[30] Foreign Application Priority Data

Aug. 22, 1990 [DE] Fed. Rep. of Germany ....... 4026513

[51] Int. Cl.$^5$ .............................................. F02N 17/08
[52] U.S. Cl. ................. 123/179.15; 123/1 A; 123/179.5; 123/494
[58] Field of Search ............... 123/179.12, 179.13, 123/179.14, 179.15, 179.5, 1 A, 179.16, 179.17, 494

[56] References Cited

U.S. PATENT DOCUMENTS 3,704,702 12/1972 Aono .............................. 123/179.15
4,706,630 11/1987 Wineland et al. .................. 123/1 A
4,770,129 9/1988 Miyata et al. ...................... 123/1 A
4,993,391 2/1991 Kuribara et al. .................... 123/1 A

FOREIGN PATENT DOCUMENTS 3137492 4/1983 Fed. Rep. of Germany .
2-149759 6/1990 Japan .
1395634 5/1975 United Kingdom .

Primary Examiner—Andrew M. Dolinar
Attorney, Agent, or Firm—Brumbaugh, Graves, Donohue & Raymond

[57] ABSTRACT

In the disclosed embodiments, a fuel supply system for an internal combustion engine operating on alcohol-containing fuel has a fuel pump and a cold-starting device for injecting an auxiliary fuel into an air-fuel intake line of the engine. A control unit controls the operation of the cold-start device when the temperature is lower than a predetermined lower temperature limit and the actuation time is adjustable as a function of temperature. The actuation time of the cold-start device is also controllable as a function of the alcohol content of the fuel.

14 Claims, 2 Drawing Sheets

FUEL SUPPLY SYSTEM FOR AN ENGINE OPERATING AN ALCOHOL-CONTAINING FUEL

BACKGROUND OF THE INVENTION

This invention relates to fuel supply systems for internal combustion engines intended for operation with fuel containing alcohol.

In the German publication "Developments in Automotive Technology and Road Transportation" (Federal Minister for Research and Technology "Motor Vehicles and Road Traffic" Status Seminar 8) by TUV Rheinland GmbH, a fuel supply system for internal combustion engines operating on pure alcohol is disclosed. To solve cold-start problems, that system includes a cold-starting device constructed in the form of a fuel evaporator. Using a so-called cold-start spray, auxiliary or starting fuel is sprayed on heating elements in order to produce a mixture of methanol vapor and air, which then passes through the intake system of the engine into its combustion chambers. Operation of the disclosed cold-starting device requires a certain actuating time, referred to in that publication as the "preheat" time, which depends on the temperature of the engine. The relationship between temperature and the preheat time is such that, with lower and lower temperatures, the preheat time increases linearly.

German Offenlegungsschrift No. 31 37 492 also describes a cold-starting device for an internal combustion engine operating on pure alcohol. The cold-starting device described in that publication automatically switches itself on when a starter switch associated with the engine is actuated if the temperature is below a predetermined value.

SUMMARY OF THE INVENTION

Accordingly, it is an object of the invention to provide a fuel supply system for an engine intended for operation on an alcohol-containing fuel which overcomes the disadvantages of the prior art.

Another object of the invention is to provide a fuel supply system for internal combustion engines operating on alcohol-containing fuel which assures good starting performance of the engine for fuels containing different proportions of alcohol.

These and other objects of the invention are attained by providing a fuel supply system for an engine intended for operation with alcohol-containing fuels which includes a cold-starting device and a control unit responsive to the alcohol content of the fuel for controlling the actuation time of the cold-starting device.

In accordance with the invention, the cold-start device is operated only for a period of time long enough to assure proper operation of the engine so as to minimize contamination of the atmosphere and conserve fuel. The control of the cold-start device in accordance with the alcohol content of the fuel permits curtailment of the actuating time required for engine starting if the proportion of alcohol in a gasoline-alcohol mixture is reduced. Another advantage of the invention is that, for electronically controlled internal combustion engines, an alcohol sensor for determining the alcohol content of the fuel can be integrated in the existing control system so as to control the fuel injection system and the ignition system of the engine.

In a fuel supply system arranged according to the invention, it is also appropriate to provide for automatic actuation of the fuel injection system when the starter is actuated, as described in Offenlegungsschrift No. 31 37 492. For cold-starting, therefore, it is not necessary for the operator to separately actuate any other controls.

According to an especially advantageous refinement of the invention, an alcohol sensor for determining the alcohol content of the fuel is located in a fuel supply line associated with the fuel injection valve of the engine. Thus the alcohol sensor may be positioned as close as possible to the point of fuel injection, so that the alcohol content signal transmitted to a control device associated with the engine will as nearly as possible match the fuel composition at the point of injection. Alternatively, however, it may be advantageous to locate the alcohol sensor in a fuel return line if a throttle is provided in that line downstream from the alcohol sensor. The cross-section of the throttle aperture should be selected so that the alcohol sensor is always filled with fuel but is acted upon only by a low fuel pressure. Thus, the return line may be provided with an alcohol sensor designed for lower pressures and hence of more economical construction. With such an arrangement, of course, care should be taken that the proximity of the alcohol sensor in the return line and the supply line to the point of injection and the consequent heating of the alcohol sensor will not result in formation of any vapor bubbles that would adversely influence measurement of the fuel composition.

Special care should also be devoted to measures described herein for avoidance of warm-start problems. By suitable control of the same components which are required for operation of the engine, provision can be made for cooling the injection valves without any additional equipmental requirement.

Improvements in the operating performance of the engine under varying load conditions are also achieved according to another refinement of the invention by controlling the fuel injection pressure at the injection valve of the engine as a function of signals received from the alcohol sensor.

BRIEF DESCRIPTION OF THE DRAWING

Further objects and advantages of the invention will be apparent from a reading of the following description in conjunction with the accompanying drawings, in which.

DESCRIPTION OF PREFERRED EMBODIMENTS

Figure 1:
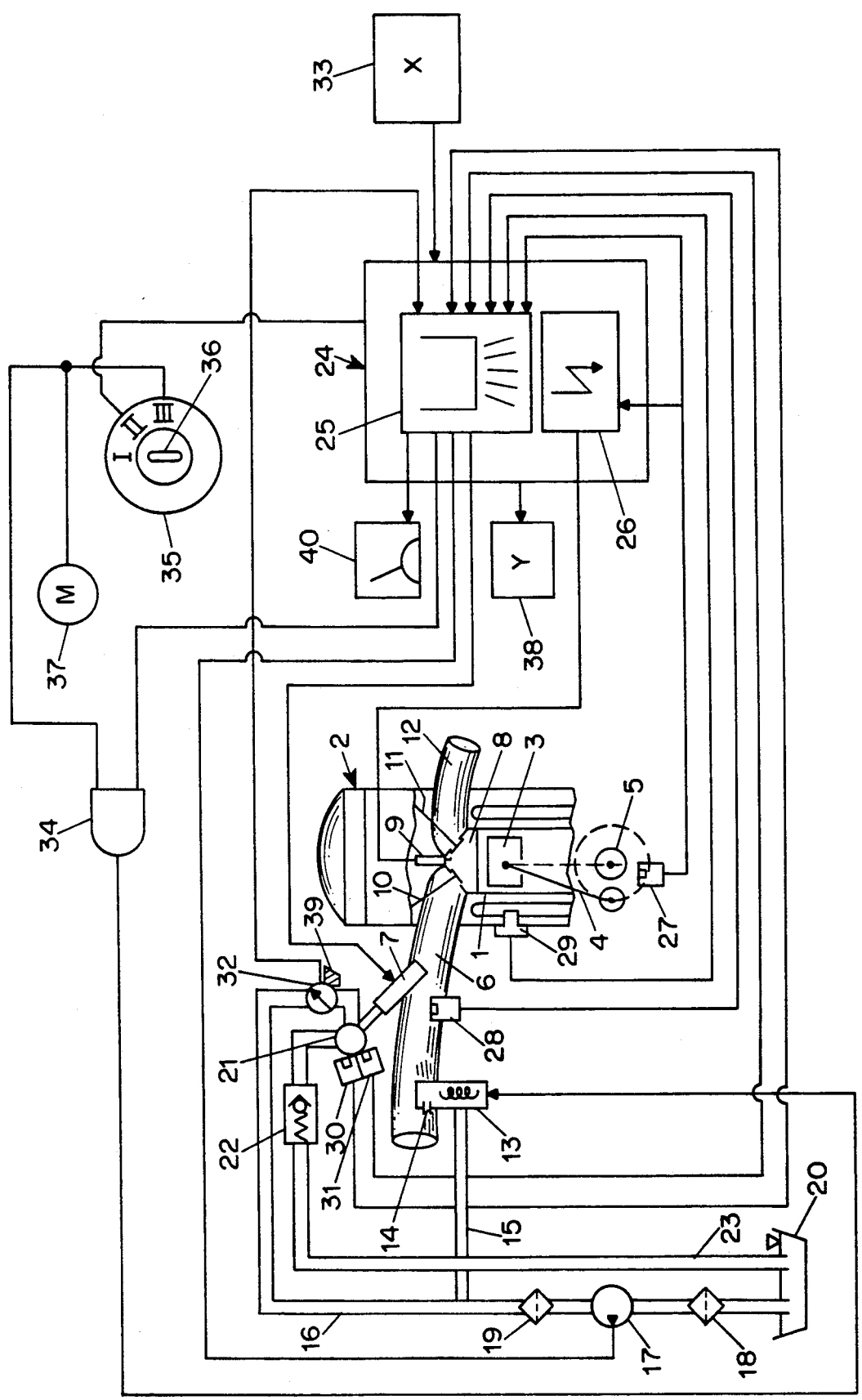
FIG. 1 is a schematic diagram illustrating a representative embodiment of a fuel supply system arranged according to the invention.

In the typical embodiment of the invention schematically illustrated in FIG. 1, a cylinder 1, shown in a fragmentary sectional view, is part of an internal combustion engine 2, which may, for example, be a four-stroke Otto engine. It will be understood, however, that the invention is applicable also to other types of engines, such as Diesel, two-stroke and rotary-piston engines, for example. In the engine 2, a piston 3, which is movable up and down, is joined by a connecting rod 4 to a crankshaft 5, so that the translatory motion of the piston 3 is converted into rotary notion of the crankshaft. Other components related to the basic operation of the engine 2 are an air intake line 6 having an injection valve 7 for injection of fuel to supply a fuel-air mixture for normal engine operation into a combustion chamber 8, a spark plug 9, an intake valve 10 and an exhaust valve 11, as well as an exhaust line 12.

A cold-starting device 13, which may be supplied with air through an opening 14 and with fuel from a branch fuel line 15, is provided for injection of auxiliary or starting fuel into the air intake line 6. In this embodiment, the branch fuel line 15 is connected to a fuel supply line 16 through which a fuel pump 17 delivers fuel from a fuel tank 20 to a manifold 21 connected to the injection valve 7 after the fuel has passed through a prefilter 18 and a fine filter 19. The manifold 21, illustrated in cross-section, is also connected to the injection valves for the other cylinders. In multi-cylinder engines, the pressure generated by the fuel pump 17 is limited to a predetermined maximum value by a pressure-limiting valve 22. If this maximum pressure value is exceeded, the excess fuel will flow back to the fuel tank 20 through a fuel return line 23.

The operation of the internal combustion engine 2 is controlled by a control unit 24 which includes an injection computer 25 and an ignition computer 26 of conventional design. To detect the operating conditions during operation of the engine 2, sensors located at various positions in the engine transmit signals to the control unit 24 through corresponding lines. Thus, for example, the ignition computer 26 receives signals from a speed sensor 27 associated with the crankshaft 5 which also transmits signals to the fuel injection computer 25. The injection computer is also connected to an intake temperature sensor 28 which detects the intake air temperature, an engine temperature sensor 29, a fuel pressure sensor 30 associated with the manifold 21, and a fuel temperature sensor 31 which likewise is connected to the manifold 21.

Immediately adjacent to the injection nozzle 7 is an alcohol sensor 32 located in the fuel supply line 16 and mounted, for example, on a part of the frame 29 near the engine 2. Alternatively, however, the alcohol sensor 32 may be mounted on the engine 2 itself. In that case, of course, insulation from heat and vibration will be required to ensure firstly that vapor bubbles will not form and secondly that undue mechanical stresses will not be produced in the alcohol sensor 32. A box 33, designated "X", indicates that, in principle, the control unit 24 may process still other signals than those described herein, which are of no importance, however, in the context of the invention. Conceivably, for example, fuel signals might be provided by a so-called λ-probe and a knock sensor.

The ignition computer 26 of the control unit 24 triggers the spark plug 9 by way of an ignition coil and a distributor, which are not illustrated, and the fuel pump 17 and the injection valve 7 are acted upon by the fuel injection computer 25. Another output signal from the fuel injection computer 25 leads to an "and" gate 34, where it is combined with the signal from a starting switch in a conventional ignition switch 35. If an ignition key 36, which is schematically indicated in the drawing, is in the position designated "I", all functional units of the engine 2 are disconnected. By turning the ignition key 36 to the position designated "II", the fuel pump 17 and all the vehicle electrical systems except the starter, including the control unit 24, are placed in operation. Further rotation to the position designated "III" closes the starting switch to activate a starter 37. A box 38, designated "Y", indicates that other functional elements of the engine 2, not shown in the drawing, for example, a device for idling control, may be governed by the control unit 24.

To start the engine 2, the ignition key 36 is normally rotated out of position I past position II into position III. When the ignition key 36 is turned to position III, the control unit 24 determines, as soon as position II is reached, on the basis of signals supplied by the alcohol sensor 32 and the engine temperature sensor 29, whether operation of the cold-starting device 13 is required. If such operation is required, according to an especially advantageous refinement of the invention, only the spark plug 9 is activated at first by the control unit 24, so that, in this phase, the piston 3 is moved up and down only by the starter 37. By virtue of such "ignition without fuel", any condensates present on the spark plug and also on the wall of the combustion chamber 8 are eliminated. Additionally, this procedure preheats the combustion chamber 8 as a result of the compression produced by motion of the piston 3 due to the starter. The duration of "ignition without fuel" may be preselected by the control unit 24 or else determined as a function of a combustion chamber temperature sensor, not shown in the drawing. After termination of the "ignition without fuel", the starter 37 is activated as before and the injection valves 7 and, if necessary, the cold-starting device 13, will be automatically switched on by the control unit 24. The switch-on time of the cold-starting device 13, if required, will likewise be determined by the injection computer 25.

During the "ignition without fuel" operation, the fuel delivered by the fuel pump 17 through the supply line 16 to the manifold 21 is returned to the tank 20 by way of the pressure-limiting valve 22 and the fuel return line 23 as soon as a predetermined fuel pressure in the manifold 21 is exceeded. The mixture injected into the cylinder by the injection valves 7 and, if required, by the cold-starting device 13, is ignited by the activated spark plug 9, starting fuel combustion in the engine 2 so that it can be brought up to speed in the usual manner of an internal combustion engine. The actuation time of the cold-starting device 13 must now be so controlled as a function of the engine temperature and the fuel composition so that, at least for part of the warm-up phase, only auxiliary fuel from the branch line 15 can be injected. Preferably, the cold-starting device 13 is switched off after a successful starting of the engine 2, that is, after stable operating performance is attained.

The typical fuel supply system shown by way of example in the drawing is also suitable for eliminating warm-start problems. If the engine 2 is shut down after operating for some time at maximum load, the fuel will tend to form vapor bubbles, especially in the hot injection valves 7 and the hot manifold 21. For better flushing and cooling of the injection valves, therefore, the injection computer 25, based on signals transmitted by the engine temperature sensor 29 and the alcohol sensor 32 as well as the fuel temperature sensor 30, determines a time during which the fuel pump 17 is switched on but the injection valves 7 are kept closed after the starter switch is activated. Much as in a cold start, the spark plug 9 may be energized for "ignition without fuel" with the injection valves closed. After expiration of the period of time determined by the injection computer 25, during which the injection valves have been cooled by intake air flow and the fuel supply lines have been purged of bubbles, the injection valves 7 are actuated to start the engine 2. This mode of operation will warm up and run the engine 2 to idling speed quickly. This in turn has the result that, after the engine 2 is started, an exhaust gas composition low in pollutants is achieved immediately. By virtue of the alcohol sensor, the duration of injection valve cooling during a warm start can be reduced at higher engine temperatures in accordance with the fuel composition. The minimum temperature for use of this cooling mode may, for example, be 90° C. measured at the intake temperature sensor 28.

Likewise of special significance in the illustrated embodiment of the invention is the ability to control the volume of fuel injected as a function of the alcohol content of the fuel. For this purpose, the pressure generated by the fuel pump 17 is adjusted in accordance with the fuel composition. This adjustment takes into account the fact that, with higher proportions of alcohol in a gasoline-alcohol fuel mixture, the specific energy content of the fuel decreases. To make up for this decreasing energy content, the fuel pressure generated by the fuel pump 17 is raised with increasing alcohol content. As a result, the injection valves can be as compact as possible while supplying an adequate volume of fuel to the engine 2 at full load even at low temperatures. The injection valve size should be kept as small as possible so that, even at low rates of fuel throughput, for example, at idling or at partial load, the injection volume can be carefully controlled. Especially good operating performance of the engine 2 is achieved if the fuel pressure is increased in small discrete steps or else continuously from about half-load up to full-load according to increased alcohol content signals from the alcohol sensor 32. To raise the fuel pressure with increasing load, therefore, an additional signal may be picked up from a sensor element associated with an output setting element of the engine such as a throttle flap. In the typical embodiment shown in the drawing by way of example, a throttle flap switch or potentiometer could be provided.

The fuel supply system here proposed thus makes possible not only a favorable starting performance over all temperature ranges encountered in practice, but also ensures good performance during normal operation of the engine 2. This is provided in part, for example, by the intake temperature sensor 28, which enables the injection computer 25 to make the optimum adjustment of a fuel-air mixture.

The invention is not limited to the embodiment illustrated by way of example in the drawing. Thus, for example, the cold-starting device 13 might conceivably be supplied with fuel from a separate tank which is not necessarily of the same composition as the main fuel supply in the tank 20. The auxiliary fuel used might indeed be of an entirely different kind. It should also be emphasized that the solution here proposed for dealing with cold-start problems is not specifically limited to such internal combustion engines as have an injection valve associated with each individual cylinder. It is also useful in a centralized injection system in which one injection valve of suitable configuration supplies fuel to all the cylinders of an engine. Moreover, the invention may also be applied to internal combustion engines utilizing a carburetor.

Figure 2:
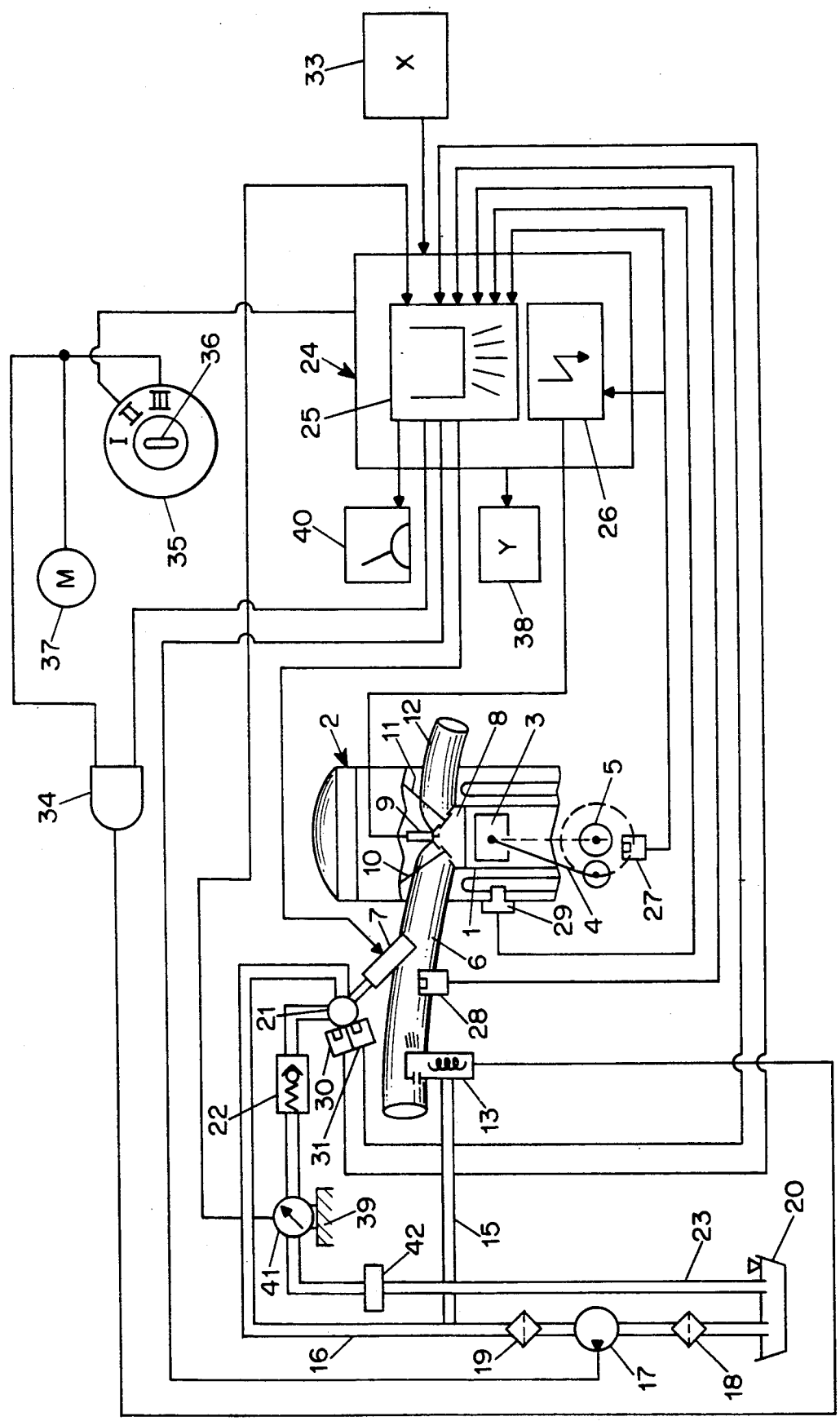
FIG. 2 is a schematic diagram illustrating another embodiment of a fuel supply system arranged according to the invention.

It may be of help to the vehicle operator to be constantly informed of the proportion of alcohol in the fuel especially with respect to refueling since this is of special importance in estimating the operating range of the vehicle. For this purpose, the signal received from the alcohol sensor 32 may be supplied by the control unit 24 to an indicator 10 located in the interior of the vehicle. This indicator may also be associated with a warning device which emits a signal when the level in a separate fuel tank used for cold-starting falls below a predetermined limit, and when the fuel composition present in the main fuel tank shows a proportion of alcohol above a predetermined limit. In place of the alcohol sensor 32 in the fuel line 16, an alcohol sensor 41 may be disposed in the fuel return line 23 with a throttle 42 located downstream from the sensor, as shown in FIG. 2.

Although the invention has been described herein with reference to specific embodiments, many modifications and variations therein will readily occur to those skilled in the art. Accordingly, all such variations and modifications are included within the intended scope of the invention.

We claim:

1. A fuel supply system for an internal combustion engine operating on alcohol-containing fuel comprising an engine start switch, a fuel pump, an air intake line, cold-start means for injecting auxiliary fuel into the air intake line, control means for controlling the actuation time of the cold-start means as a function of temperature when the engine temperature is below a predetermined lower temperature limit, fuel ignition means and fuel injection means for injecting fuel during normal engine operation actuated by the control means, wherein the cold-start means is switched on automatically upon actuation of the engine start switch, the control means controls the actuation time of the cold-start means additionally as a function of the alcohol content of the fuel supplied to the engine and the control means controls the engine operation when the cold-start means is actuated so that the fuel ignition means is actuated without the fuel injection means being actuated for a predetermined time period preceding actuation of the fuel injection means or the cold-start means.

2. A fuel supply system according to claim 1, including a main fuel tank and a main fuel supply like and an alcohol sensor associated with the main fuel supply line.

3. A fuel supply system according to claim 1, including fuel injection means having at least one injection valve for injecting fuel and including an alcohol sensor for detecting the alcohol content of the fuel supplied to the injection valve.

4. A fuel supply system according to claim 3, including a main fuel supply line for supplying fuel to the fuel injection means and wherein the alcohol sensor is located in the main fuel supply line.

5. A fuel supply system according to claim 3, including a fuel return line for returning fuel from the fuel injection means having a throttle opening with a selected cross-section, wherein the alcohol sensor is located in the fuel return line upstream from the throttle.

6. A fuel supply system according to claim 1, including an engine in a vehicle having a support structure and an alcohol sensor is mounted on the support structure near the engine for detecting the alcohol content of fuel supplied to the engine.

7. A fuel supply system according to claim 1, including an alcohol sensor located on the engine or an engine attachment for detecting the alcohol content of fuel supplied to the engine.

8. A fuel supply system according to claim 1 wherein the control means controls the fuel injection means so that, when the engine rest temperature is at a value above a predetermined upper temperature limit, the fuel injection means is activated for a predetermined period of time after the engine is started depending on said rest temperature and the alcohol content of the fuel supplied to the engine, permitting fuel delivered to the fuel injection means to cool to injection means.

9. A fuel supply system according to claim 8, including an ignition means and a starter switch and wherein the control means is arranged so that, upon actuation of the starter switch, the fuel pump is automatically turned on and the ignition means may also be actuated automatically.

10. A fuel supply system according to claim 1, including fuel injection means and wherein the control means controls the volume of fuel injected by the fuel injection means as a function of the alcohol content of the fuel.

11. A fuel supply system according to claim 10, including an alcohol sensor providing signals representing the alcohol content of the fuel and wherein the control means increases the fuel injection pressure with increasing alcohol content of the fuel in accordance with signals from the alcohol sensor.

12. A fuel supply system according to claim 11 wherein the control means also controls the fuel injection pressure as a function of the temperature of the engine.

13. A fuel supply system for an internal combustion engine operating on alcohol-containing fuel comprising a fuel pump, an air intake line, cold-start means for injecting auxiliary fuel into the air intake line and control means for controlling the actuation time of the cold-start means as a function of temperature when the engine temperature is below a predetermined lower temperature limit, wherein the control means controls the actuation time of the cold-start means additionally as a function of the alcohol content of the fuel supplied to the engine, including an alcohol sensor for detecting the alcohol content of fuel supplied to the engine and visual display means responsive to the alcohol sensor for providing a visual indication of the alcohol content of fuel supplied to the engine.

14. A fuel supply system for an internal combustion engine operating on alcohol-containing fuel comprising a fuel pump, an air intake take line, cold-start means for injecting auxiliary fuel into the air intake line and control means for controlling the actuation time of the cold-start means as a function of temperature when the engine temperature is below a predetermined lower temperature limit, fuel injection means, and an alcohol sensor providing signals representing the alcohol content of the fuel, wherein the control means controls the actuation time of the cold-start means additionally as a function of the alcohol content of the fuel supplied to the engine, and controls the volume of fuel injected by the fuel injection means as a function of the alcohol content of the fuel and increases the fuel injection pressure with increasing alcohol content of the fuel in accordance with signals from the alcohol sensor and wherein the control means also controls the fuel injection pressure as a function of an engine output condition signal.

* * * * *

UNITED STATES PATENT AND TRADEMARK OFFICE
CERTIFICATE OF CORRECTION

PATENT NO. : 5,190,001
DATED : March 2, 1993
INVENTOR(S) : Steinke et al.

It is certified that error appears in the above-identified patent and that said Letters Patent is hereby corrected as shown below:

Title page, Item 54, line 2, "OPERATING AN" should read --OPERATING ON--;

Column 1, line 2, "OPERATING AN" should read --OPERATING ON--;

First page, Item 75, first line, "Steinke Dieter" should read --Dieter Steinke--;

Column 6, line 1, "10" should read --40--.

Signed and Sealed this

Thirtieth Day of November, 1993

Attest:

BRUCE LEHMAN

Attesting Officer

Commissioner of Patents and Trademarks